J. M. LARSH.
LOAD EQUALIZER FOR VEHICLES.
APPLICATION FILED SEPT. 9, 1918.
1,363,327.
Patented Dec. 28, 1920.
4 SHEETS—SHEET 1.
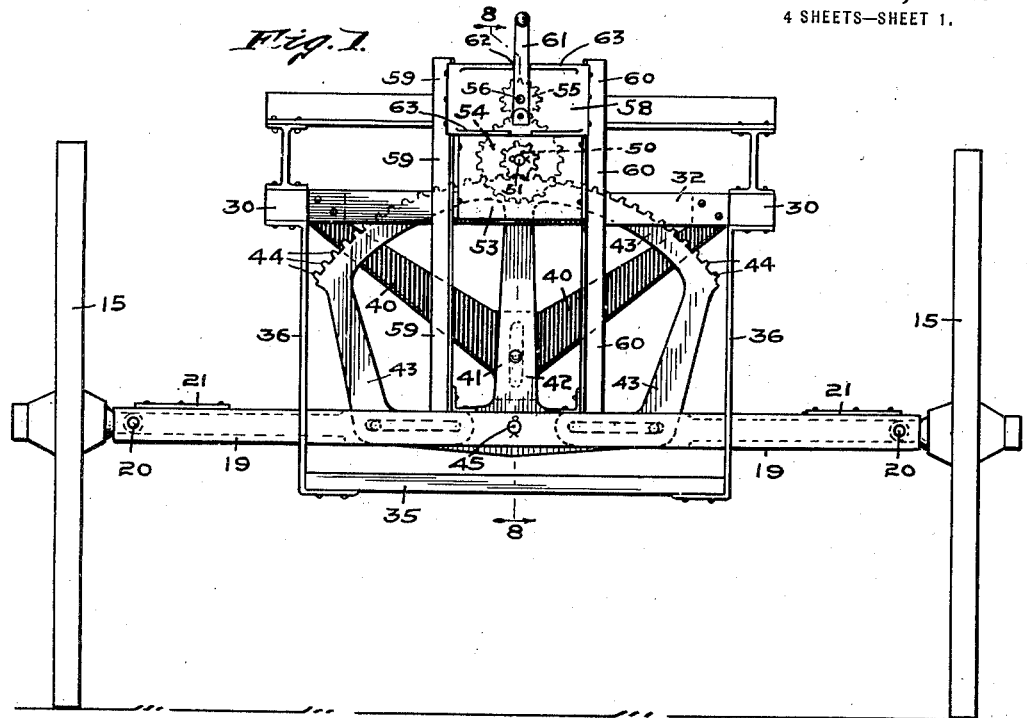
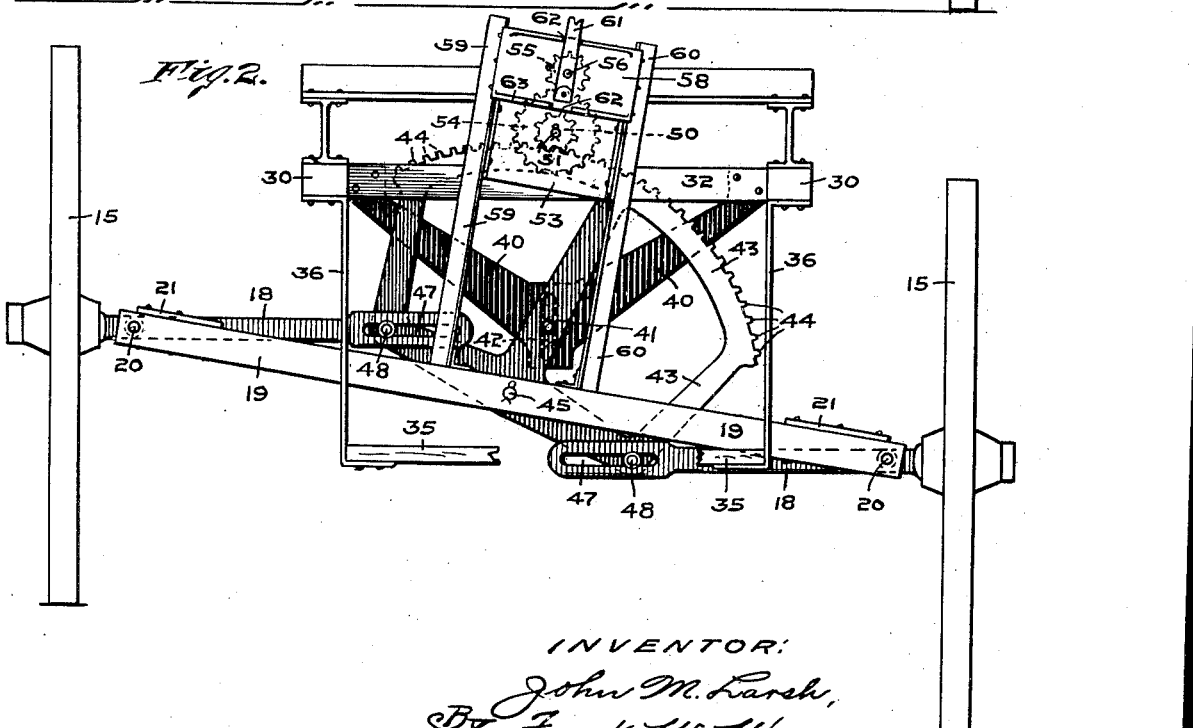
INVENTOR:
John M. Larsh,
By Frank W. Woerner,
ATTORNEY.

J. M. LARSH.
LOAD EQUALIZER FOR VEHICLES.
APPLICATION FILED SEPT. 9, 1918.
1,363,327.
Patented Dec. 28, 1920.
4 SHEETS—SHEET 2.
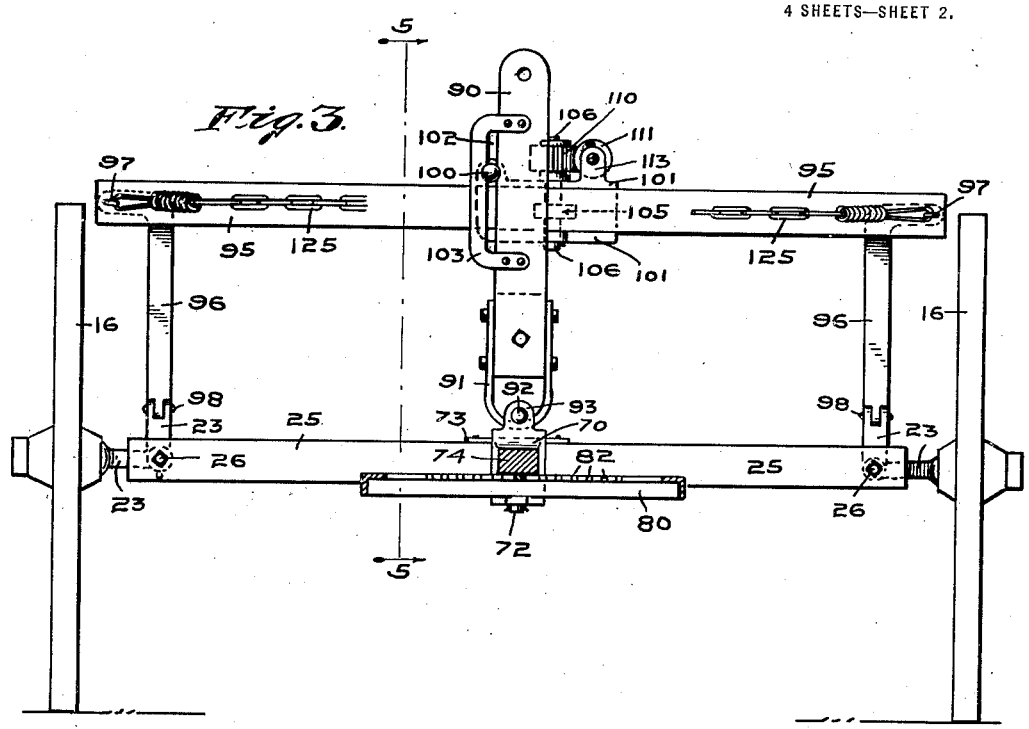
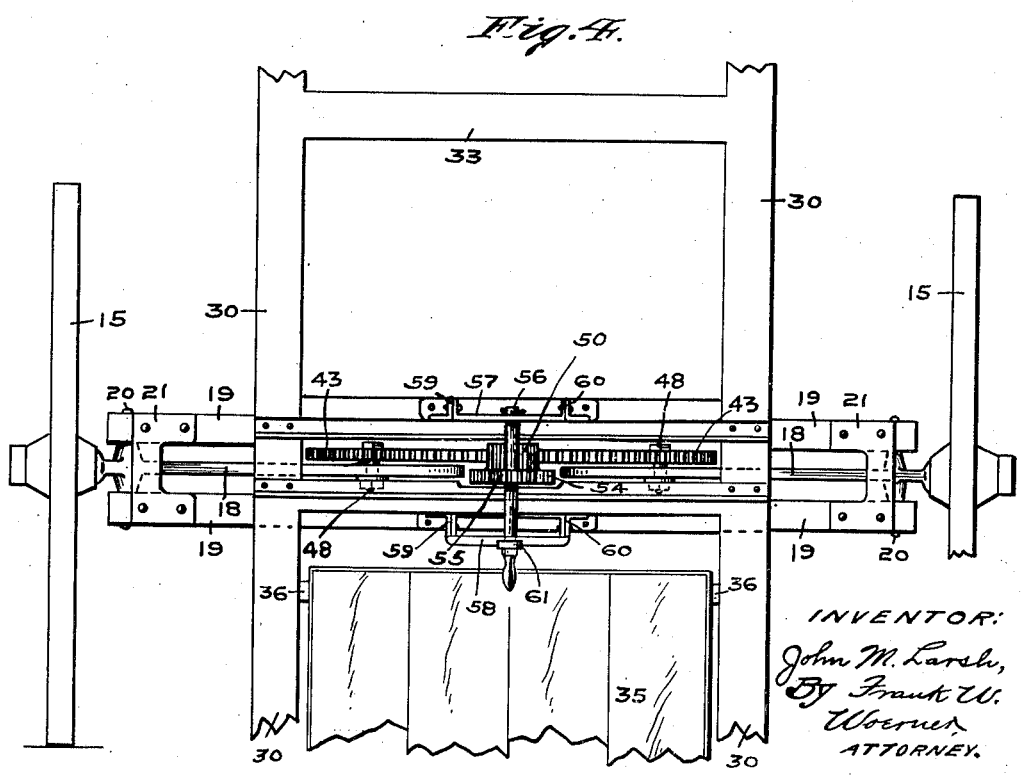
INVENTOR:
John M. Larsh,
By Frank W. Woerner,
ATTORNEY.

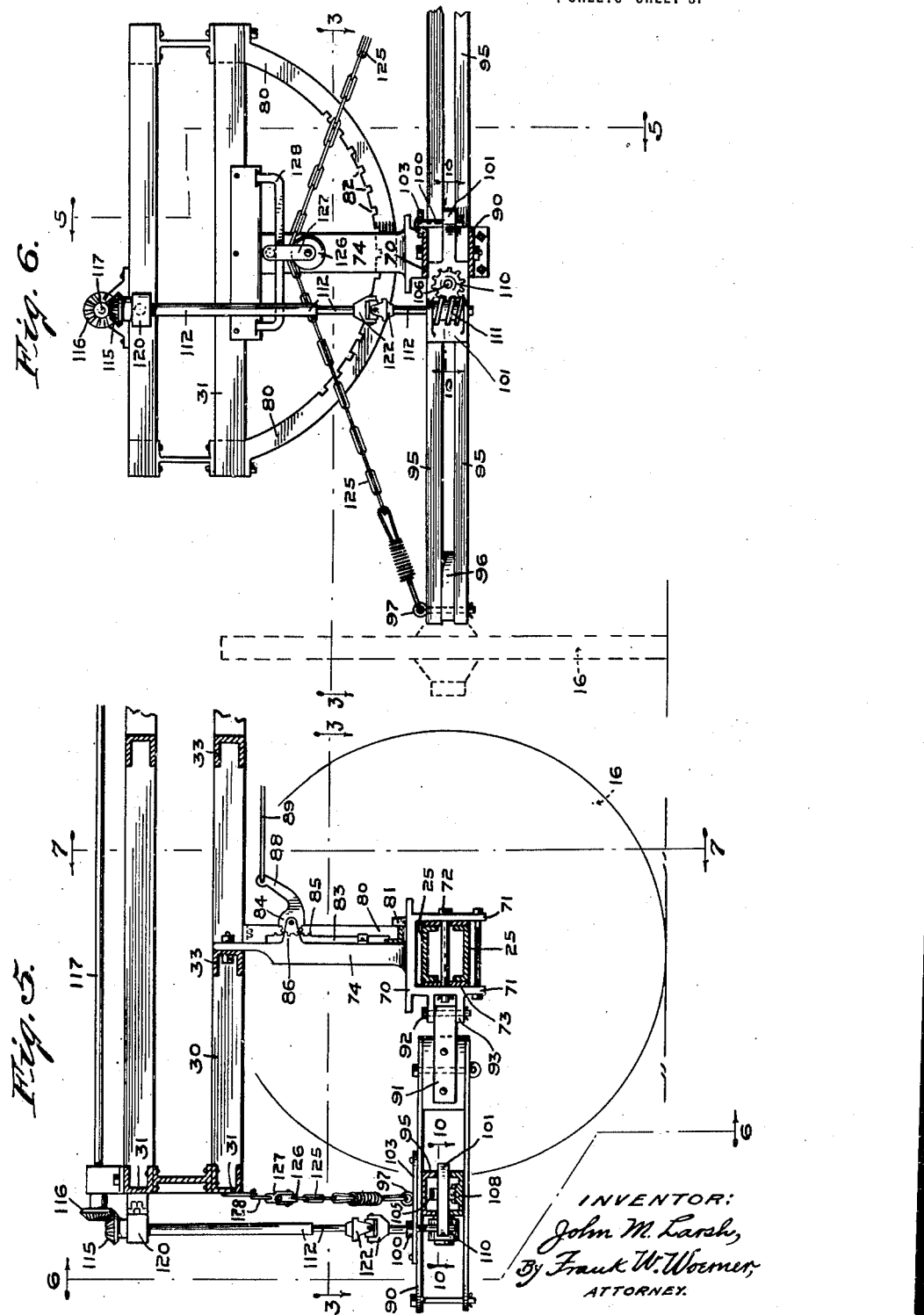

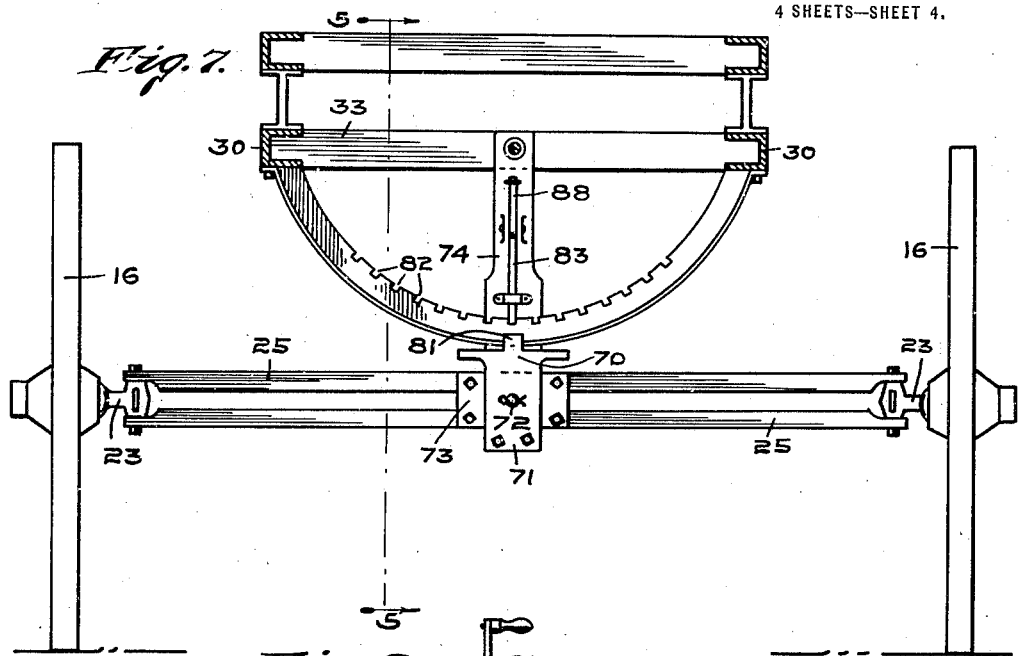

UNITED STATES PATENT OFFICE.

JOHN M. LARSH, OF TERRE HAUTE, INDIANA.

LOAD-EQUALIZER FOR VEHICLES.

1,363,327.  Specification of Letters Patent.  Patented Dec. 28, 1920.

Application filed September 9, 1918. Serial No. 253,249.

*To all whom it may concern:*

Be it known that I, JOHN M. LARSH, a citizen of the United States, residing at Terre Haute, in the county of Vigo and State of Indiana, have invented certain new and useful Improvements in Load-Equalizers for Vehicles, of which the following is a specification.

This invention relates to a certain mechanism for maintaining the equilibrium of loads carried upon the running gears of certain classes of vehicles, and is particularly applicable for use in connection with vehicles for road construction, such, for instance, as graders, ditching-machines, dump-wagons, tank wagons, for oiling surfaces of roadways, and the like, where the wheels on one side of the vehicles ofttimes are rolling over ground of a higher altitude—as upon the crown of the road—than the wheels on the opposite side of the vehicles.

One of the objects of the invention consists in the provision of certain means employed in connection with the running gears of certain classes of vehicles by which the center of the load can be constantly maintained parallel with the perpendicular, this being particularly desirable for use in connection with tank wagons to prevent the shifting of their liquid loads, when the wheels on one side of the vehicle are elevated above the others, thereby removing the danger of overturning on account of being top heavy.

A further object of the invention consists in the provision of means for maintaining the equilibrium of a vehicle body and its load parallel with the horizontal, so that the weariness experienced by the operators, in working all day upon an inclined floor of the conventional styles of road making apparatuses when the wheels on one side are elevated above the wheels on the other, is removed.

A still further object of the invention consists in the provision of certain means by which the operator can easily and quickly bring the vehicle body and its load to a horizontal position, whenever the elevation of the surface over which the wheels on one side of the vehicle are rolling is increased or decreased.

A still further object of the invention consists in the provision of an apparatus of the above character, which is simple in construction, easy to operate, efficient, and cheap to manufacture.

I accomplish the above objects of the invention, and such others as may appear from a perusal of the specification and claims, by means of the construction illustrated in the accompanying drawings, forming a part hereof, in which—

Figure 1 is a rear elevation of the running gear of a vehicle in which both of the wheels are standing at a uniform level, showing the relative positions occupied by the different parts comprising my invention. Fig. 2 is a view similar to Fig. 1, except that the parts of my invention are shown in their changed positions, as when the wheels on one side of the vehicle are elevated above the wheels on the other side. Fig. 3 is a plan view of the front portion of the running gear, showing the arrangements of the steering and draft equalizing mechanism, on the line 3—3 in Figs. 5 and 6. Fig. 4 is a top or plan view of the rear portion of the apparatus, showing the position occupied by the shifting mechanism. Fig. 5 is a fragmentary detail vertical sectional view of the front end of the apparatus, on the lines 5—5 in Figs. 3, 6 and 7. Fig. 6 is a fragmentary detail front elevation of the front end of the apparatus, on the line 6—6 in Fig. 5. Fig. 7 is a vertical cross sectional view of the apparatus, on the line 7—7 in Fig. 5. Fig. 8 is a fragmentary detail vertical sectional view, on an enlarged scale, of the operating mechanism, on the line 8—8 in Fig. 1. Fig. 9 is a side view of the hand operating crank. Fig. 10 is a fragmentary detail view, on an enlarged scale, on the lines 10—10 in Figs. 5 and 6.

Referring to the drawings, 15 represents the rear wheels, and 16 the front wheels of the apparatus. The rear wheels 15 are mounted on suitable spindles which terminate in arms 18 which extend inwardly toward the longitudinal center of the apparatus, and the arms 18 are pivotally connected together by means of a pair of parallel rear axle bars 19, the latter being pivoted at their extreme outer ends to arms 18 near the spindles, by means of the pivots 20. Rear axle bars 19 are spaced apart (Fig. 4) to afford clearance for the movable arms 18, and bars 19 are constantly held in parallel relation by means of suitable tie-plates 21.

The front wheels of the apparatus are mounted on suitable spindles which terminate in the L-shaped arms 23, the latter being sustained in proper relation by means of the front axle bars 25. The L-shaped arms 23 are pivotally mounted near the ends of front axle bars 25, by means of the transverse bolts 26, so that the front wheels are free to oscillate independently of front axle bars 25. The associated parts for effecting the oscillation of front wheels 16 will be hereinafter more particularly described.

The apparatus is provided with a rectangularly shaped frame-work consisting generally of side members 30, end members 31 and 32, together with any desired number of intermediate transverse truss-members 33, for supporting a suitable body-bed or tank (not shown), depending upon the particular kind of a load it is desired to transport. The rectangular frame is provided at its rear end with a suitable standing platform 35 for the operator, said platform being arranged a suitable distance below the frame to render the movable parts of the apparatus readily accessible, by means of the supporting straps 36. The rear portion of the rectangular frame is suspended from a horizontally disposed shaft 51 by means of a pair of parallel horizontally disposed plates 49 which attach at their ends to the side members 30 of the frame, said plates having alined openings for the passage of shaft 51. The ends of shaft 51 are suitably supported in bearing-plates 52 and 53 which are attached to uprights 59 and 60 carried by axle bars 19, 19.

When the wheels on one side of the vehicle roll over a ground surface of greater altitude than that over which the wheels on the opposite side are moving, which in ordinary vehicles would place the vehicle bodies in a corresponding inclined position, the operator is able in the present apparatus to maintain the vehicle body, or load in a horizontal position by means of certain construction and arrangement of parts to be hereinafter described, thereby not only removing the possibility of the vehicle turning over but enables the operator to perform his labor in a more normal and less tiresome position.

The above mentioned construction by which the operator can maintain the body or load in a horizontal position contemplates the use of a sector-gear 43 which is arranged parallel and intermediate the axle bars 19, 19, said sector-gear being oscillatively mounted on a pivot-bolt 45 passing transversely through the center of both axle-bars 19, 19, as clearly shown in Fig. 8. Sector-gear 43 is also provided with an eccentrically located fixed pin 41 which extends through a vertical slot 42 in the lower portion of a Y-shaped member 40 the free ends of the bifurcated arms of which extend to and attach to the opposite side members 30 of the frame, and the connection formed between the pin and slot not only serves to shift the body laterally during the oscillatory movement of sector-gear 43 but constantly maintains the center of the body in line with the center of gravity. Sector-gear 43 is also provided with a pair of wrist-pins 48 one of which is located a uniform distance on each side of pivot-pin 45. These wrist-pins engage suitable slots 47 in the adjacent ends of arms 18, so that when axle-bars 19, 19 assume an inclined position (Fig. 2) sector-gear 43 may be oscillated a sufficient distance on pivot-bolt 45 for maintaining arms 18 in horizontal position and wheels 15 in vertical position and thereby prevent the body or load from assuming undesirable positions, resulting from inequalities in the surface of the road.

Sector-gear 43 is oscillated on pivot-bolt 45 by means of an idler pinion 50 which is mounted on transverse shaft 51, and pinion 50 is rotated through the medium of an enlarged integral pinion 54, which meshes with an operating pinion 55, the latter being mounted upon a shaft 56 which is carried by the plates 57 and 58 secured to the parallel uprights 59 and 60 and move with rear axle bars 19, as heretofore described. Movement of rotation is imparted to pinions 55, 54, 50 and sector-gear 43 by means of a hand-crank 61 mounted on shaft 56 and is readily accessible by the operator from platform 35.

With the preceding description, together with an examination of Figs. 1 and 2, it will be observed that when the wheels 15 and 16 on one side of the apparatus are elevated above the wheels on the opposite side, the rectangular body 30 and its load, which, in other apparatuses, would assume an inclined position, is maintained horizontal by rotating hand-crank 61 in a direction to oscillate sector-gear 43 and cause the free end of arm 18 on the elevated side of the apparatus to be maintained in a horizontal position, while the free end of arm 18 on the opposite and lower side of the apparatus is depressed for maintaining it in a horizontal position, whereby frame 30 and the load are constantly held in a horizontal position. Hand-crank 61 may be retained in a determined position, when the rectangular frame has been brought to a horizontal position, by means of suitable notches 62 cut into the upturned edges 63 of plate 58, and hand-crank 61 is positively held within notches 62 when the two are brought into registration by means of a spring 64. See Figs. 8 and 9.

By means of the heretofore described mechanism, it will be readily observed how the rectangular frame and its load may be supported and maintained in a horizontal position irrespective of the differences in altitudes which may exist in the cross section of a road surface occupied by the apparatus.

In order that the front part of the vehicle will freely respond to the oscillating movement imparted at the rear of the apparatus, and to lock the forward portion of the frame 30 when the same has been adjusted in the desired position contemplates the introduction of certain mechanism which will now be described.

Pivotally mounted on the central portion of the front axle bars 25, by means of a pivot bolt 72, is a casting 70 having a pair of depending wings 71 which straddle said bars 25. Pivot bolt 72 passes through wings 71 of casting 70 and through the tie-plates 73, the latter being secured to the front and rear sides of the front axle bars 25, clearly shown in Figs. 5 and 7 of the drawings, so as to permit front axle bars 25 to oscillate when one front wheel 16 is elevated above the other. Formed integrally with casting 70 and extending upwardly therefrom is an upright 74 which is pivotally connected at its upper end with one of the transverse truss-members 33 of the rectangular frame 30. Secured near the opposite edges and the underside of rectangular frame 30 is a segmental notched rack 80 which rides against the back face of upright 74 and behind a lug 81 formed integrally with casting 70, and the inner arc-shaped edge of rack 80 is provided with a plurality of notches 82 which are adapted to be engaged by a sliding latch-bar 83 slidingly mounted against the adjacent face of upright 74. Latch-bar 83 is susceptible of being moved into and out of engagement with notches 82 in rack 80 by means of a toothed cam 84 which engages the teeth 85 in the adjacent face of latch-bar 83, and cam 84 is pivotally mounted in ears 86 which are formed integrally with upright 74. Cam 84 terminates in an actuator-lever 88, and the latter is actuated by means of an operating-rod 89 which extends to the rear end of the apparatus and within easy reach of the operator standing on platform 35. The operator initially actuates cam 84 so as to disconnect latch-bar 83 from notches 82 in rack 80 for releasing the forward portion of the rectangular frame before said frame is tilted by hand-lever 61, as has heretofore been described, and at the conclusion of adjusting the rectangular frame by hand lever 61, latch-bar 83 is again moved into engagement with one of the registering notches 82 in rack 80, whereby the forward portion of the rectangular frame is sustained in the desired adjusted position.

The apparatus may be horse drawn or it may be moved along by a portable engine or tractor, and proper connection is made with the apparatus by means of a jack-tongue or pole 90 which is pivotally connected with casting 70 by ears 93 on casting 70. As jack-pole 90 is not employed for guiding the course of the apparatus, and as it is desirable to steer the apparatus from the operator's platform 35, I provide an equalizing or compensating device which may be shifted from the operator's platform to so turn the front wheels 16 as to direct the movement of the apparatus into the direction taken by the tractor, or other traction device. The steering device for changing the direction of travel of the apparatus contemplates the employment of a pair of parallel channel bars 95, which are separated a sufficient distance apart to permit the introduction of a pair of flat draft bars 96, the front ends of these bars connecting with the extreme outer ends of bars 95 by means of suitable pins 97. The rear ends of the bars 96 are hingedly connected, as at 98, with the free ends of the L-shaped arms 23 carrying the front wheels 16, which have heretofore been described. The upper and lower plate comprising jack-pole 90 straddles the channel bars 95, as shown in Figs. 5 and 6, and the jack-pole 90 and the bars 95 are slidingly connected together by means of a pin 100. Pin 100 is retained in and moves with a plate 101, which is inserted in the intervening space between the two channel bars 95, and through a slot 102 formed along the edge of jack-pole 90 by means of a U-shaped strap 103. This construction permits a sliding movement between jack-pole 90, as the latter swings about its pivot, and bars 95, when the latter move longitudinally.

As shown in Fig. 10 of the drawings, the central portion of plate 101 is cut away to provide an opening for a pinion 105 which is mounted on shaft 106, suitably journaled in plate 101. Pinion 105 engages a rack-bar 108 which is secured to one of the channel-bars 95. One end of shaft 106 is provided with a gear-wheel 110, which is engaged and operated by a worm-gear 111 mounted on a shaft 112. The worm-gear 111 is maintained in proper working relation with gear-wheel 110 by being properly journaled in ears 113 which are formed integrally with plate 101. Shaft 112 extends upwardly across the front end of the machine, as shown in Figs. 5 and 6, and is provided at its upper end with a bevel gear-wheel 115 which meshes with a corresponding gear 116 arranged on the end of an operating shaft 117 which extends back to a point within easy reach of the operator. By means of the foregoing description it will be observed that when the operator rotates shaft 117, movement of rotation is imparted to shaft 112, and through the medium of worm-gear 111 corresponding movement of rotation is imparted to gear-wheel 110, shaft 106 and pinion 105, and by means of the latter's engagement with rack-bar 108, channel bars 95 are moved longitudinally for oscillating wheels 16 through the draft-bars 96 and L-shaped arms 23. Shifting bars 95 longitudinally and the tilting action of the rectangular frame changes the distance between worm-gear 111 and bevel gear 115 on the upper end of shaft 112, and to compensate for this variation in distance between the above points shaft 112 is made in two parts which are telescoped together, and which are so constructed that while the sections of shaft 112 are free to move longitudinally they rotate in unison. The longitudinal movement of bars 95 also changes the angularity of shaft 112, and to accommodate said shaft to this variable movement, the upper end of this shaft is mounted in a journal-box 120 which is pivotally connected to the frame of the apparatus, and into the lower section of the shaft I introduce a universal-joint 122 of any preferred type, so that with the variable movements afforded by swinging box 120 and the universal-joint 122, shaft 112 is capable of accommodating itself to the various changes that may arise when the several parts are shifted.

In order to support channel-bars 95 at all times in a horizontal position, without interfering with the individual movements of the parts, when it is desired to change the direction of travel of the apparatus, I provide a chain 125 which is secured to the outer ends of bars 96 by means of the pins 97. Chain 125 passes over a sheave 126 which is supported in a yoke 127, the latter being free to roll along a track 128 which is suitably supported by the frame of the apparatus. By means of this construction when bars 95 are moved longitudinally, sheave 126 is free to move a like distance along track 128 so as to keep the latter approximately in the center of chain 125 for sustaining bars 95 and their associated parts in a state of balance.

Having thus fully described my said invention, what I desire to secure by Letters Patent, is—

1. In a vehicle of the character described, vehicle wheels, spindles for mounting the wheels, a vehicle axle pivoted at its ends at points intermediate the ends of the spindles, a vehicle body suspended upon said vehicle axle, an oscillating gear wheel pivotally secured to the central portion of said vehicle axle, means for connecting the free ends of the spindles to the adjacent portions of the sector-gear, and means for oscillating said sector-gear, for maintaining the spindles in horizontal position relatively to the angular travel of the vehicle axle.

2. In a vehicle of the character described, vehicle wheels, spindles for mounting the wheels, said spindles having slots in their free end portions, a vehicle axle pivoted at its ends to the intermediate portions of the spindles, a vehicle body suspended upon said vehicle axle, an oscillatory gear wheel carried by said vehicle axle, means carried by the gear wheel for engaging the slots in the ends of the spindles, and means for oscillating said gear wheel on its pivot.

3. In a vehicle of the character described, vehicle wheels, spindles for mounting the wheels, said spindles having slots in their free end portions, a vehicle axle pivoted at its ends to the intermediate portions of the spindles, a vehicle body suspended upon said vehicle axle, an oscillatory gear wheel carried by said vehicle axle, means carried by the gear wheel for engaging the slots in the ends of the spindles, means for oscillating said gear wheel on its pivot, and means for holding the gear wheel in predetermined positions.

4. In a vehicle of the character described, vehicle wheels, spindles for mounting said wheels, a vehicle axle pivoted at its ends to the intermediate portions of the spindles, uprights on said axle, a shaft supported by said uprights, a vehicle body suspended from said shaft, an oscillating gear wheel carried by said vehicle axle, means for operatively connecting the free ends of the spindles with the adjacent portions of the gear wheel, and means for oscillating said gear wheel on its pivot.

In witness whereof I have hereunto set my hand and seal at Indianapolis, Indiana, this 31st day of August, A. D. one thousand nine hundred and eighteen.

JOHN M. LARSH. [L. S.]